(12) United States Patent
Steinmetz et al.

(10) Patent No.: US 10,505,399 B2
(45) Date of Patent: Dec. 10, 2019

(54) CONTACTLESS INDUCTIVE ENERGY TRANSMISSION APPARATUS AND METHOD

(71) Applicant: Weidmüller Interface GmbH & Co. KG, Detmold (DE)

(72) Inventors: Andreas Steinmetz, Detmold (DE); Olaf Grünberg, Blomberg (DE)

(73) Assignee: Weidmüller Interface GmbH & Co. KG (DE)

( * ) Notice: Subject to any disclaimer, the term of this patent is extended or adjusted under 35 U.S.C. 154(b) by 95 days.

(21) Appl. No.: 15/557,265

(22) PCT Filed: Apr. 8, 2016

(86) PCT No.: PCT/EP2016/057826
§ 371 (c)(1),
(2) Date: Sep. 11, 2017

(87) PCT Pub. No.: WO2016/162520
PCT Pub. Date: Oct. 13, 2016

(65) Prior Publication Data
US 2018/0062444 A1    Mar. 1, 2018

(30) Foreign Application Priority Data

Apr. 9, 2015  (DE) .................. 10 2015 105 359
Aug. 19, 2015 (DE) .................. 10 2015 113 723

(51) Int. Cl.
*H02J 50/12* (2016.01)
*H02J 50/10* (2016.01)
(Continued)

(52) U.S. Cl.
CPC ............. *H02J 50/12* (2016.02); *B60L 3/00* (2013.01); *B60L 53/12* (2019.02); *B60L 53/34* (2019.02);
(Continued)

(58) Field of Classification Search
CPC .. B60L 3/00; B60L 53/12; B60L 53/34; H01F 27/28; H01F 38/14; H02J 50/10;
(Continued)

(56) References Cited

U.S. PATENT DOCUMENTS 9,537,353 B1 * 1/2017 Bossetti ............... H02J 17/00
2010/0201315 A1  8/2010 Oshimi et al.
(Continued)

FOREIGN PATENT DOCUMENTS

JP    2013031315 A    2/2013
JP    2013078198 A    4/2013
WO   2006108787 A1   10/2006

*Primary Examiner* — Thienvu V Tran
*Assistant Examiner* — Brian K Baxter
(74) *Attorney, Agent, or Firm* — Laubscher & Laubscher, P.C.

(57) ABSTRACT

An apparatus for the contactless, inductive transmission of energy from a primary portion a secondary portion includes at least one coil in each portion which are inductively coupled to each other. The primary portion and the secondary portion include at least one magnetic field sensor and are arranged to determine a position of the secondary portion relative to the primary portion using a magnetic field generated by the coils and measured with the aid of the magnetic field sensor.

6 Claims, 3 Drawing Sheets

(51) Int. Cl.
*H02J 50/90* (2016.01)
*B60L 3/00* (2019.01)
*H02J 50/40* (2016.01)
*H01F 27/28* (2006.01)
*H02J 7/02* (2016.01)
*B60L 53/12* (2019.01)
*B60L 53/34* (2019.01)
*H01F 38/14* (2006.01)
*H02J 5/00* (2016.01)

(52) U.S. Cl.
CPC .............. *H01F 27/28* (2013.01); *H02J 7/025* (2013.01); *H02J 50/10* (2016.02); *H02J 50/40* (2016.02); *H02J 50/90* (2016.02); *H01F 38/14* (2013.01); *H02J 5/005* (2013.01); *Y02T 10/7005* (2013.01); *Y02T 10/7088* (2013.01); *Y02T 90/122* (2013.01); *Y02T 90/14* (2013.01)

(58) Field of Classification Search
CPC .. H02J 50/12; H02J 50/40; H02J 50/90; H02J 7/025; H02J 5/005; Y02T 10/7005; Y02T 10/7088; Y02T 90/122; Y02T 90/14
USPC ........................................................ 307/104
See application file for complete search history.

(56) References Cited

U.S. PATENT DOCUMENTS

| | | | |
|---|---|---|---|
| 2011/0004278 A1* | 1/2011 | Aghassian | A61N 1/3787 607/61 |
| 2012/0262002 A1 | 10/2012 | Widmer et al. | |
| 2013/0207893 A1* | 8/2013 | Liu | G06F 3/046 345/157 |
| 2014/0327322 A1* | 11/2014 | Gruenberg | H01F 38/14 307/104 |
| 2015/0035379 A1 | 2/2015 | Kwon et al. | |
| 2016/0282500 A1* | 9/2016 | Filippenko | G01V 3/104 |

* cited by examiner

CONTACTLESS INDUCTIVE ENERGY TRANSMISSION APPARATUS AND METHOD

This application is a § 371 National Stage Entry of PCT/EP2016/057826 filed Apr. 8, 2016. PCT/EP2016f/057826 claims priority of DE 102015/105359.4 filed Apr. 9, 2015 and DE 102015/113723.2 filed Apr. 19, 2015. The entire contents of these applications are incorporated herein by reference.

BACKGROUND OF THE INVENTION

The invention relates to an apparatus for the contactless transmission of energy from a primary portion to a secondary portion which each include at least one coil and which can be inductively coupled to each other, wherein a lateral offset of the secondary portion from the primary portion is determined using a magnetic field generated by the coils and measured with at least one magnetic field sensor. The invention furthermore relates to an operating method for the contactless, inductive energy transmission apparatus.

In comparison with plug-and-socket connectors in which energy transmission takes place via contact elements which are mechanically connected or separated, contactless devices for the energy transmission have less wear resulting from a large number of plugging cycles or strong vibrations. In addition, contact burn is prevented during plugging or unplugging when the device is under an electrical load. Also, there is no danger of arcing when separating plug-and-socket connectors with a high current load in contactless devices for energy transmission of energy. Finally, there is galvanic separation between the primary and secondary portions in the contactless transmission of energy which can be required, for example, when used in the medical field. In addition, the lack of expensive, mechanically intermeshing contacts makes it possible to configure the device with surfaces which are as smooth as possible, which makes the contactless devices suitable for energy transmission for application purposes requiring a high degree of cleanliness/hygiene intended, for example, for the food service field.

In particular, the high resistance to wear also makes a contactless, inductive energy transmission device suitable for use in automation, such as for example, for the transmission of energy to a robotic alternating tool.

BRIEF DESCRIPTION OF THE PRIOR ART

Publication No. WO 2013/087676 A2 discloses an apparatus for the contactless, inductive transmission of energy from a primary portion to a secondary portion which can replace a mechanical plug-and-socket connection for transmitting energy, for example, to an alternating tool of a robot. The primary portion and the secondary portion each include at least one coil which are inductively coupled to each other and which cooperate with a ferrite core. Owing to its permeability, the ferrite core increases the magnetic flux in such a manner that small devices with small transmission surfaces, high electrical transmission performance is obtained.

The transmission of energy is also possible by the high magnetic flux if the primary portion and the secondary portion are not in a position in which the distance between them is minimal but rather when there is a gap between them. Energy transmission can also take place where there is a lateral offset of the primary portion and the secondary portion, i.e., when the coils of the primary portion and the secondary portion are not located on a common axis. However, a gap between or lateral offset of the coils that is too great influences the maximum energy that can be transmitted. Even if energy supply to a connected device in some operating states of the device is possible in spite of a lateral offset or of a large gap of the coils, in other operating states in which a higher performance is required, unpredictable operating disturbances of the device can occur since the required performance cannot be transmitted.

US patent application publication No. 2010/0201315 A1 also describes an arrangement for the inductive transmission of energy. The apparatus is especially suitable as a cableless loading apparatus for mobile devices. A primary portion of the apparatus can be mounted, for example, below a plate so that a mobile device, for example, a mobile telephone forming a secondary portion of the apparatus can be charged by simply setting it on the plate.

In the primary portion or in the secondary portion, auxiliary coils functioning as magnetic sensors are arranged around the corresponding coil. A lateral offset between the primary and the secondary portions is determined from the magnitude of the magnetic field measured by the auxiliary coils and is displayed to the user so that he can position the mobile device and therefore the secondary portion so that it is laterally aligned relative to the primary portion. Alternatively, the maximum possible loading current is determined and a signal is issued when the current is above a given threshold value. A corresponding signal then indicates to the user that the mobile device is properly positioned.

However, the conventional methods do not provide sufficient operational reliability in applications in which a high degree of availability of supplied components and rather high energy transmission performance are important. For example, in industrial robot installations, variations in distance can result in an abrupt interruption of energy transmission.

The present invention was developed to eliminate as much as possible unpredictable operating disturbances during charging of a device by a contactless energy transmission apparatus.

SUMMARY OF THE INVENTION

An apparatus for the contactless, inductive transmission of energy capable of determining a distance along an axis of a primary-side coil between the secondary portion and the primary portion using the magnetic field measured by at least one magnetic field sensor.

The coils of the primary portion and secondary portions used for the transmission of energy generate a stray field that is used to determine the position of the secondary portion relative to the primary portion. An initial inaccurate or imprecise position of the secondary portion relative to the primary portion can be recognized by determining the axial distance in addition to the lateral offset.

The determined position can be transmitted via a network to a control device such as an automating system. In the case of deviations from a theoretical position, a user or operator is alerted so that the user or operator can adjust the positioning of the secondary portion relative to the primary portion.

Position determination usually requires the use of a transmitter for a test signal and a receiver for the test signal. In accordance with the invention, a signal which is already present from the stray field of the coils used for energy transmission is used as the test signal. Accordingly, the transmitter for the test signal can be eliminated. The determination of position can be obtained by using at least one magnetic field sensor by adding only one receiver for the test signal.

In a preferred embodiment of the apparatus, at least one magnetic field sensor is an auxiliary coil which induces a signal. A magnetic alternating field is used for the transmission of energy. Therefore, magnetic field measuring can occur with the aid of an auxiliary coil In another embodiment of the apparatus, at least one magnetic field sensor is arranged in the primary portion. In this manner, the information about the positioning of the secondary portion can be immediately determined in the primary portion, and no reply from the secondary portion to the primary portion is necessary in order to guarantee reliable operation of the primary portion. The primary portion can also be connected as a stationary portion of the transmission apparatus to an automating control and the position information can thus be forwarded to the automating control.

In another embodiment of the apparatus, at least one magnetic field sensor in the primary portion or in the secondary portion is arranged laterally offset relative to the particular coil. At least two magnetic field sensors are preferably provided in the primary portion and/or in the secondary portion and are symmetrically arranged in pairs around a longitudinal axis of the particular coil. It is also preferable if four magnetic field sensors are arranged in the primary portion and/or the secondary portion around the particular coil. In the paired arrangement, signals from the magnetic field sensors can be compared with each other and differences in the signals can be observed which are decisive for a lateral offset. An interval from the primary portion and from the secondary portion and a lateral offset in every direction can be determined by using four sensors. In alternative embodiments, more than four magnetic field sensors can be used, for example, in order to further increase the precision with which interval and/or offset can be determined.

An operating method according to the invention for an apparatus for the contactless, inductive transmission of energy from a coil of a primary portion to a coil of a secondary portion is distinguished in that the lateral offset as well as the axial interval between the secondary portion and the primary portion are determined using a magnetic field generated by the coils and measured with at least one magnetic field sensor.

In a preferred embodiment of the operating method, the relative position is determined using measuring values from four magnetic field sensors which are arranged in the primary portion around its coil. An interval from the primary portion and from the secondary portion and a lateral offset in every direction can be determined by the use of four sensors. At least one auxiliary coil is preferably used as at least one magnetic field sensor, wherein a signal induced in the at least one auxiliary coil is measured. Furthermore, a signal amplitude, in particular a voltage amplitude which evaluates at least one auxiliary coil, is used as a signal.

In another embodiment of the operating method, the signal amplitudes from each of a pair of two opposed auxiliary coils are calculated with one another in order to determine the lateral offset of the secondary portion relative to the primary portion and in order to determine the axial interval or distance between the secondary portion and the primary portion. The lateral offset preferably includes a radial interval between axes of the coils and has an angle between an interval vector which extends from the axis of the coil of the primary portion to the axis of the coil of the secondary portion and between a defined spatial direction.

The offset is indicated in polar coordinates from which the lateral interval of the coil axes is immediately apparent, as well as the direction in which the secondary portion is shifted relative to the primary portion. The direction of the offset provides information about a potential imbalance of the rotation even if the absolute value of the lateral interval of the coil axes is constant, for example, where the secondary portion rotates relative to the primary portion.

In another embodiment of the operating method, transmission of energy from the primary portion to the secondary portion is suppressed if the lateral offset of the secondary portion relative to the primary portion and/or the interval between the secondary portion and the primary portion, i.e., the magnitude of the air gap exceeds a given boundary value. In this manner, disturbance-free transmission of energy up to the specified maximum power is ensured. Boundary values can be in the form of tables or can take into account a functional relationship where a simultaneous combination of lateral offset and interval are allowed.

BRIEF DESCRIPTION OF THE FIGURES

The invention is explained in detail in the following description when viewed in the light of the accompanying drawing, in which.

DETAILED DESCRIPTION

Figure 1:
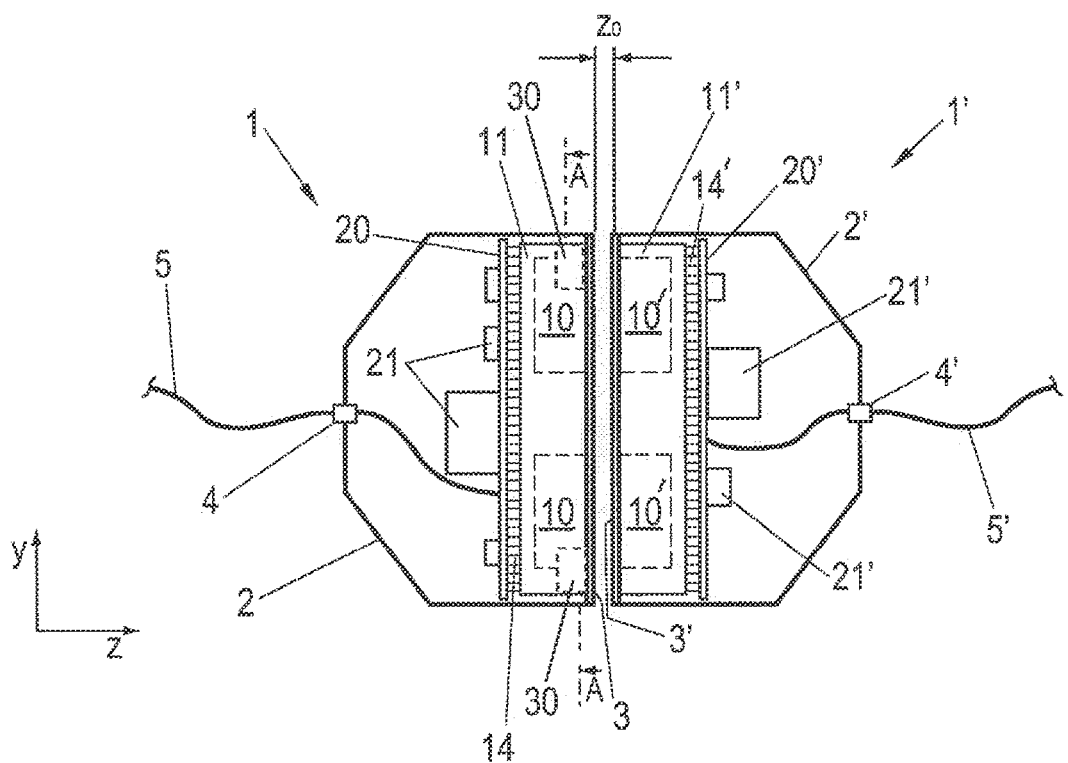
FIG. 1 is a sectional view of an apparatus for contactless transmission of energy.
Figure 2:
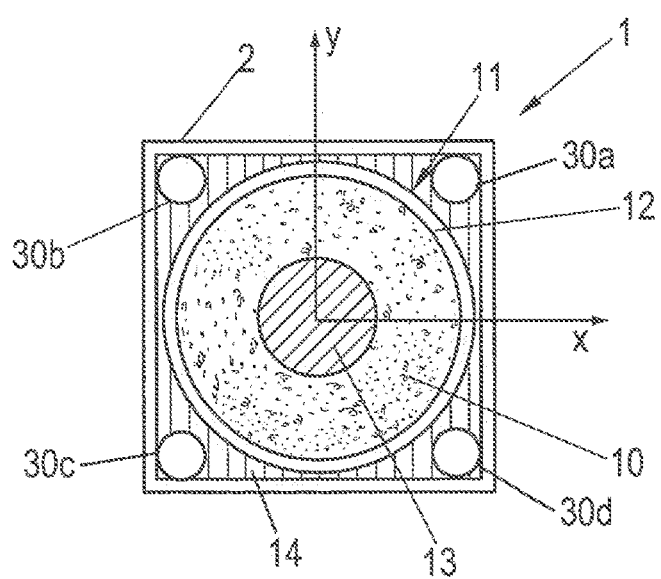
FIG. 2 is another sectional view of the apparatus shown in FIG. 1.

FIG. 1 is a schematic sectional view of an apparatus for the contactless transmission of energy from a primary portion 1 to a secondary portion 1'. FIG. 2 is a sectional view of the primary portion taken along the section line A-A shown in FIG. 1.

Elements associated with the primary portion 1, also referred to as primary-side elements, have reference numerals without an apostrophe in the drawing figures. Elements associated with the secondary portion 1', also referred to as secondary-side elements, have reference numbers with an apostrophe. The primary-side and secondary-side elements which have the same or a comparable function are provided with reference numerals with the same numbers. If no explicit reference is made in the following description to the primary side or the secondary side, reference numerals without an apostrophe are used which refer to both sides.

Primary portion 1 and secondary portion 1' each include a housing 2 which can be manufactured from a material customary for a plug-type housing such as plastic, aluminum, high-grade steel or the like. The housings 2 are constructed as half-shells, wherein the front side is closed by a cover plate 3. In the rear area of the housing 2, facing away from the cover plate 3, a through-put connector 4 for introduction of a connection cable 5 is provided.

A coil 10 is arranged directly behind each cover plate 3 and is wound onto a ferrite core 11 or onto a coil body which is inserted in the ferrite core 11. The coil 10 can be wound with a single conductor. However, in order to reduce the skin affect, a multi-conductor, high-frequency stranded wire is preferred.

In the embodiment shown in the drawing, the ferrite core 11 is a round cup-shaped core with an outer edge 12 and an concentric inner dome or projection 13. Such a core is also designated as a cylindrically symmetrical E-core. The cross-sections of the outer edge 12 and of the inner dome 13 are preferably generally equal in size in order to achieve a homogeneous magnetic flux density, taking into account the different stray fields within the ferrite core 11. Ferrite cores with different geometrical configurations may also be used. For example, quadric or rectangular cores with round or quadratic or rectangular ferrite cores can be used. In addition, coils without a coil body such as with conductors adhered to each other can also be used.

The ferrite cores 11 are open toward the respective cover plates 3. On the opposite side, the outer edge 12 and the inner dome 13 of each core are connected to one another by a cup bottom. The coil 10 is arranged in the annular trough defined between the outer edge 12 and the inner dome 13. Any area between the outer and the inner edge of the coil 10 and the ferrite core 11 can be filled with a heat-conducting medium.

During operation, the primary portion 1 and the secondary portion 1' are brought toward one another with their cover plates 3, 3' facing one another for the contactless, inductive transmission of energy. In FIG. 1, as the gap between the plates is shown as a transmission slot or interval $z_0$. The magnitude of a permissible transmission interval $z_0$ is in the range of 0 to a few millimeters or centimeters as a function of the magnitude of the diameter of the coils 10 and/or of the ferrite cores 11. The axial direction of the primary-side coil 10 is designated as the z direction and the associated axis as the z axis. The x and y directions and axes run vertically with respect to the z axis in the plane of the front plate 3.

During operation, the primary-side or primary coil 10 is supplied with an alternating current. A resonance circuit is formed from the primary coil 10 and a resonance capacitor (not shown) whose frequency range is in the area of a few kilohertz (kHz) to a few hundred kHz, wherein the frequency range in the area of 10 kHz is especially preferred. The alternating current is supplied to the primary coil 10 by an inverter. For example, a pulse width modulation (PMW) method can be used in the inverter to generate the alternating voltage. The inverter is located together with monitoring and control apparatuses on a plate 20 inside the housing 2 of the primary portion 1. In FIG. 1, electronic components 21 are shown by way of example on the plate 20. In order to protect the inverter from an excess resonance rise of the amplitude on the resonance circuit, the resonance circuit is slightly super-resonant, that is, operated at frequencies above the resonance frequency.

Transmission of energy takes place upon magnetic coupling between the primary coil 10 and the secondary-side or secondary coil 10'. The coupling is especially efficient owing to the presence of ferrite cores 11 and 11'. A voltage is induced in the secondary coil 10' which, after rectification, voltage conversion, and optionally voltage stabilization is ready as output voltage on the connecting cable 5' for outputting the transmitted energy. The electronic components 21 on the secondary side are also arranged on a plate 20'. The secondary coil includes a center tap so that a synchronous rectifier can be used.

Heat-conducting elements such as heat-conducting mats 14 are arranged between the particular ferrite core 11 and the plate 20 in the primary portion 1 as well as in the secondary portion 1'. The electronic structural components 21 arranged on the plate 20 on the primary and secondary sides represent a loss source in the transmission path. The heat loss generated by these structural elements 21 is transmitted via the heat-conducting mats 14 onto the ferrite core 11. This heats the ferrite core 11 during operation to a higher operating temperature than would be the case without thermal coupling to the plate 20.

Given suitable ferrite materials for the ferrite cores 11, the losses at a lower temperature in the ferrite core 11 are greater than at a higher temperature over a broad frequency range and magnetizing range. The previously described charging of the heat loss power of the electronic components into the ferrite core 11 raises its temperature and consequently lowers the heat loss power in the ferrite core 11 by re-magnetization. This improves the total degree of efficiency of the transmission system. This effect can be used on the primary side as well as on the secondary side. At the same time, the ferrite cores 11, 11' are used by the thermal coupling as a cooling body for the electronic components 21, 21', which results in an additional effect in a savings of material and therefore of cost. Instead of the heat-conducting mats 14, a cast mass can also be used, for example, to thermally couple the plate 20 and the ferrite core 11.

No intermeshing guide or positioning elements are provided in the embodiment shown which would align the primary portion 1 and the secondary portion 1' laterally with one another if they were joined together. As a result of the lack of such elements, the primary portion 1 and the secondary portion 1' can also be displace by a lateral movement, that is, a movement in the x direction and/or in the y direction, into the operating position or the portions can be separated from one another. This proves to be especially advantageous particularly in the area of automation since an additional axial movement of the primary portion 1 and the secondary portion 1' relative to one another is not necessary to establish or separate a connection. However, depending on the planned usage, such guiding or positioning elements can also be provided in alternative embodiments.

The ferrite cores 11, 11' allow a high magnetic flux density by which an efficient transmission of energy is possible even in the case of small core volumes. The transmission is relatively tolerant in this case to a lateral shifting of the primary portion 1 and of the secondary portion 1' toward one another. This is a great advantage, for example, in the area of automation since a high degree of positional accuracy is no longer needed for establishing a conventional plug connection requiring a contact.

Nevertheless, knowledge of the position of the secondary portion 1' relative to the primary portion 1 is advantageous in order to be able to prevent an unexpected collapse of the transmission which can be initiated in the case of small performances during operation where higher performances are to be transmitted. Furthermore, changing the position of the two portions relative to one another indicates possible mechanical or electromechanical problems, e.g. in the robot in which the apparatus is used for the transmission of energy, and can therefore provide information relative to operational safety.

The primary portion 1 of the apparatus includes at least one magnetic field sensor which determines the stray field of the coils 10, 10'. In the embodiment shown, four auxiliary coils 30a, 30b, 30c and 30d are used as magnetic field sensors which are arranged in four quadrants of the cover plate 3 adjacent to the coil 10. Each coil of the two pairs of auxiliary coils 30a, 30c and 30b, 30d oppose each other symmetrically to the central point of the coil 10. The position of the four auxiliary coils 30a, 30b, 30c and 30d is shown in FIG. 2. If no explicit reference is made in the following description to an individual one of the auxiliary coils 30a, 30b, 30c and 30d, the auxiliary coils 30a, 30b, 30c and 30d are characterized globally with the reference numeral 30.

The auxiliary coils 30 are receiving coils in which a signal is induced by the stray fields of the primary and secondary coils 10 and 10' which is evaluated by an evaluation circuit on the plate 20 of the primary portion 1. The level of the signals induced in the auxiliary coils 30 is a function of the interval or gap $z_0$ between the primary and the secondary portions 1, 1' as well as of a lateral offset in the x and the y directions as will be described below in connection with FIGS. 3 and 4.

Figure 3:
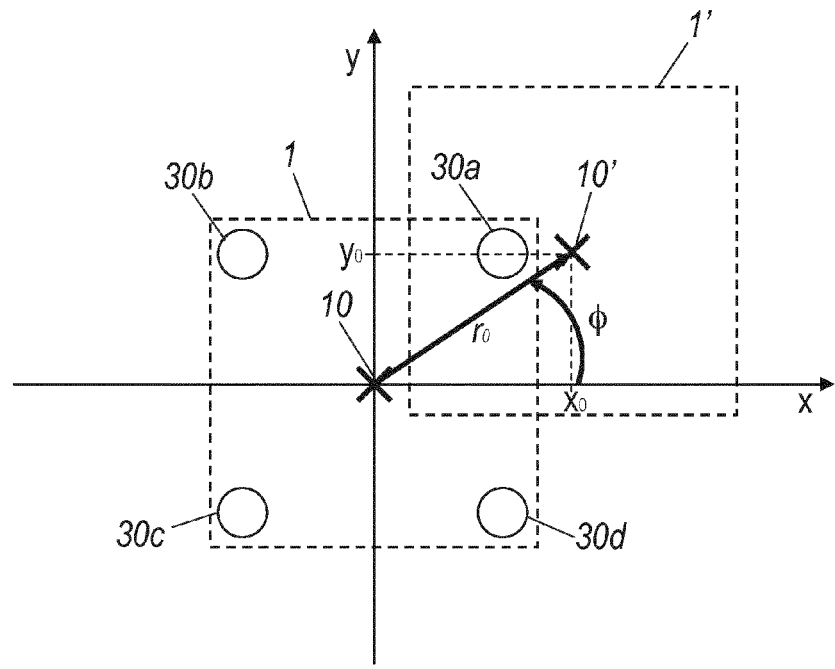
FIG. 3 is a schematic view of an apparatus for contactless transmission of energy with a lateral offset between the primary and the secondary portions.

FIG. 3 schematically illustrates primary and secondary portions 1, 1' of an apparatus for the inductive transmission of energy which are laterally offset. In Cartesian coordinates, the offset is $x_0$ in the x direction and $y_0$ in the y direction. In addition, an interval or gap of $z_0$ which is not visible in FIG. 3 can be present between the two portions 1, 1'. The lateral offsets $x_0$ and $y_0$ can also be expressed in polar coordinates and then be described by a radial interval $r_0$ of the central points of the coils 10 and 10' as well as by an angle ϕ between an interval vector and the x axis.

Figure 4:
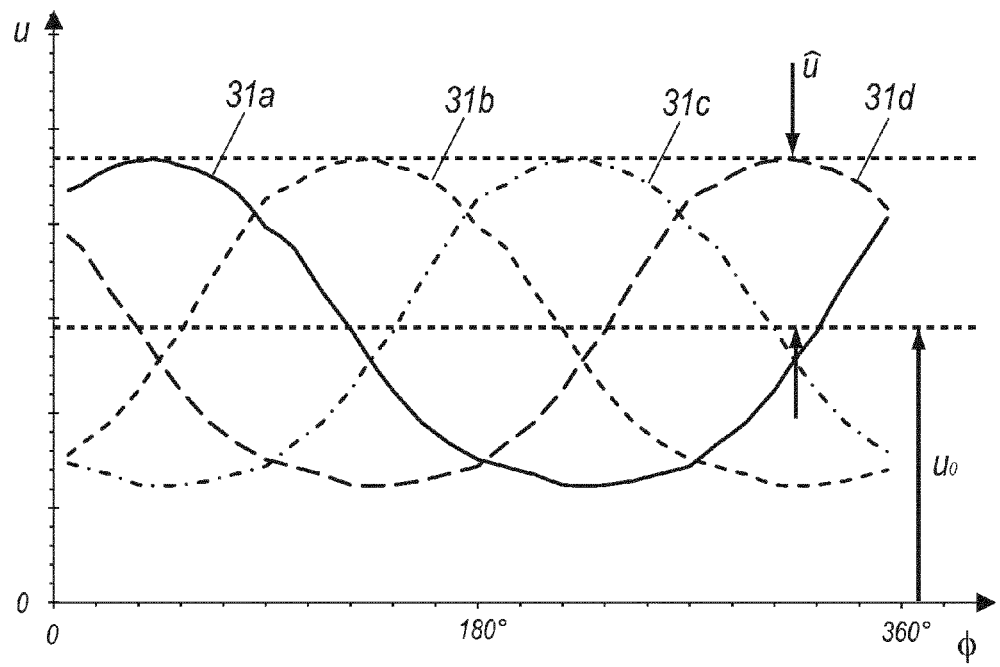
FIG. 4 is a diagram in which the level of signals from auxiliary coils is shown for the detection of positions as a function of an angle of a lateral offset.

FIG. 4 illustrates how voltage signal amplitudes 31 change in the four auxiliary coils 30 if, given a fixed interval or gap $z_0$ and a fixed radial interval $r_0$ according to the amount, the secondary portion 1' is moved circularly around the z axis of the primary portion 1. The resulting signal amplitude 31a, 31b, 31c and 31d of the auxiliary coils 30a, 30b, 30c and 30d as a function of the angle ϕ is shown. It turns out that in a first approximation there is a particular sinusoidal dependency of the signal amplitude 31 on the angle ϕ. The sinusoid curves have the same amplitude a and an offset $u_0$ that is also the same for all sinusoidal curves.

The amplitude a is primarily a function of the magnitude of the radial interval $r_0$, in contrast to which the offset $u_0$ is primarily a function of the interval or gap $z_0$ between the primary and the secondary portion 1, 1'. This special dependency which is true when using a ferrite core 11, 11' in the primary coil 10 and in the secondary coil 10' favors and simplifies a separation of the radial interval $r_0$ (and of the lateral offset $x_0$, $y_0$) and of the axial interval $z_0$. When using air coils without a ferrite core, the measured signal amplitudes influence a metallic object in the environment and stray fields of other adjacent components in a stronger manner as the axial interval of the coils increases, which renders it difficult to make a determination of the axial interval $z_0$.

In both instances, the dependency is substantially linear, in particular in the case of small values compared with the magnitude of the coils 10, 10' for the radial interval $r_0$ and the interval $z_0$. The proportionality factors for these linear dependencies can be determined in advance by measuring rows at constant current of a given level by the primary coil 10 with a known radial interval $r_0$ and a known interval $z_0$ for a given apparatus for the transmission of energy. Measured values for the determination of intervals subsequently recorded are then scaled to the conditions in the recording of the proportionality factors taking into consideration the level of the current which is then present through the primary coil 10.

During the operation of the apparatus for the transmission of energy, at first the level of the four signal amplitudes 31a, 31b, 31c and 31d is measured for an unknown interval $z_0$, an unknown radial interval $r_0$ and an unknown angle ϕ.

The sinusoidal component of the signal amplitudes 31 cancel each other by the addition of two signal amplitudes 31a and 31c or 31b and 31d of the opposite auxiliary coils 30a and 30c or 30b and 30d, as a result of which the magnitude of the offset $u_0$ can be determined. In order to obtain a good signal-to-noise ratio, the offsets $u_0$ can also be determined for both pairs of opposite auxiliary coils 31a, 31c and 31b, 31d and by the summing of all four signal amplitudes 31a-31d. The magnitude of the interval $z_0$ follows from the magnitude of the offset $u_0$ with the previously determined proportionality factor and with scaling to the level of the actual current through the primary coil 10.

The magnitude of the angle ϕ can subsequently be determined by a differential formation of each two opposite auxiliary coils 31a and 31c and 31b and 31d of two opposite auxiliary coils 30a and 30c and 30b and 30d by angular functions.

Figure 5:
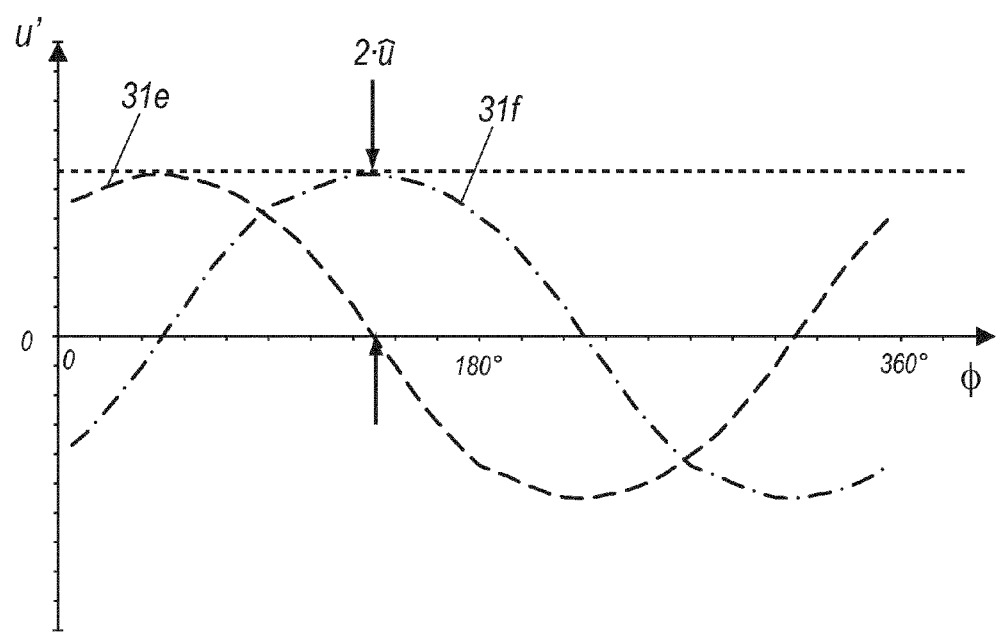
FIG. 5 is a diagram of differential signals from auxiliary coils for the detection of positions as a function of an angle of a lateral offset.

FIG. 5 shows the differences u' of each two signals as differential amplitudes 31e and 31f, again as a function of the angle ϕ. The differential signal 31e is formed from the signal amplitudes 31a and 31c and the differential signal 31f from the signal amplitudes 31b and 31d.

The two differential signals 31e and 31f are also sinusoidal with a phase shift of 90° relative to one another. The differential signals 31e and 31f show no offset and their signal amplitudes depend only on the offset, i.e., the radial interval $r_0$. The magnitude of the radial interval $r_0$ follows with the previously determined proportionality factor after scaling to the level of the actual current through the primary coil 10 from one of the amplitudes of the differential signals 31e, 31f The amplitude of the differential signals 31e, 31f is twice that of the amplitude it of the signal amplitudes 31a-d.

Finally, the angle ϕ, i.e., the direction in which the offset is present, can be determined from the phase position of one of the differential signals 31e or 31f by trigonometric functions. The phase position of the differential signals 31e or 31f can be determined on their zero throughput positions.

In sum, the radial interval $r_0$ as well as the direction angle ϕ of a lateral offset between the primary portion and the secondary portion 1, 1' can be determined according to the application with the aid of the four auxiliary coils 30 from the level of the signal induced therein by the stray field of the coils 10, 10', and also the interval $z_0$ between the primary portion and the secondary portion 1, 1'. The information about the lateral offset can also be calculated from the polar coordinates (radial interval $r_0$, angle ϕ) into Cartesian coordinates ($x_0$, $y_0$) and indicated.

The information regarding the lateral offset and interval can be indicated by a data channel of the primary portion 1. A problem with the positioning of the primary portion in the secondary portion 1, 1' relative to one another that indicates an error in a robot using the apparatus for the transmission of energy can be recognized using this information, for example, by an automation control. Furthermore, the transmission of energy from the primary portion 1 to the secondary portion 1' is interrupted or is not established in an initialization step if a determined lateral offset ($x_0$, $y_0$ or $r_0$) and/or a determined interval $z_0$ are above fixed boundary values. The boundary values can be in the form of tables or can take into account a functional relationship where a simultaneously present combination of lateral offset and interval are allowed.

The method has the advantage that an incorrectly positioned secondary side is recognized on the primary side. No reply from the secondary portion 1' to the primary portion 1 is necessary in order to guarantee reliable operation of the primary portion 1.

In an alternative embodiment of a plug-and-socket connector, a safety mechanism based on the reply of the secondary portion to a primary portion can be used regarding positioning.

In another alternative embodiment of a plug-and-socket connector, information about the lateral offset and/or about the interval using detuning of the resonance circuit is determined via the resonance frequency in conjunction with the current flowing in the primary coil This additional measurement can serve as a control measurement of the previously described interval determination via the auxiliary coils 30 in order to increase the safety of the transmission.

The invention claimed is:

1. An operating method for an apparatus for the contactless, inductive transmission of energy from a coil of a primary portion to a coil of a secondary portion, comprising the steps of
   (a) determining a lateral offset of the secondary portion to the primary portion using a magnetic field generated by the coil of the primary portion and the coil of the secondary portion and measured with at least two auxiliary coils arranged opposite one another in pairs are used as at least two magnetic field sensors for measuring voltage amplitude signals induced in said at least two auxiliary coils; and
   (b) calculating said voltage amplitude signals with one another to determine a lateral offset of the secondary portion relative to the primary portion to determine a distance along an axis of the coil of the primary portion from the secondary portion to the primary portion using the magnetic field measured by the at least one magnetic field sensor.

2. A method as defined in claim 1, wherein said at least two auxiliary coils are arranged in at least one of said primary and said secondary portions, said at least two auxiliary coils being are arranged symmetrically around a longitudinal axis of a respective one of a coil of the primary portion and a coil of the secondary portion.

3. A method as defined in claim 1, wherein four auxiliary coils are arranged in at least one of the primary and secondary portions around a respective one of a coil of the primary portion and a coil of the secondary portion.

4. A method as defined in claim 1, wherein the lateral Offset and the distance are determined using measurements from four magnetic field sensors which are arranged in the primary portion around the coil of the primary portion.

5. A method as defined in claim 1, in which the lateral offset is defined by a radial distance between axes of the coil of the primary portion and the coil of the secondary portion and an angle between an interval vector which extends from the axis of the coil of the primary portion to the axis of the coil of the secondary portion and between a defined spatial direction.

6. A method as defined in claim 1, in which transmission of energy from the primary portion to the secondary portion is suppressed when at least one of the lateral offset of the secondary portion relative to the primary portion and the distance from the secondary portion to the primary portion exceeds a given boundary value.

* * * * *